(12) United States Patent
Levitsky et al.

(10) Patent No.: US 7,926,011 B1
(45) Date of Patent: Apr. 12, 2011

(54) SYSTEM AND METHOD OF GENERATING HIERARCHICAL BLOCK-LEVEL TIMING CONSTRAINTS FROM CHIP-LEVEL TIMING CONSTRAINTS

(75) Inventors: Oleg Levitsky, San Jose, CA (US);
Chien-Chu Kuo, San Jose, CA (US);
Dinesh Gupta, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 465 days.

(21) Appl. No.: 11/621,915

(22) Filed: Jan. 10, 2007

(51) Int. Cl.
*G06F 17/50* (2006.01)

(52) U.S. Cl. ........ 716/105; 716/103; 716/104; 716/106; 716/113; 716/117; 716/134; 716/138; 716/139

(58) Field of Classification Search .............. 716/4, 5–7, 716/18
See application file for complete search history.

(56) References Cited

U.S. PATENT DOCUMENTS

| | | | | |
|---|---|---|---|---|
| 5,475,607 A | * | 12/1995 | Apte et al. | 716/113 |
| 6,099,584 A | * | 8/2000 | Arnold et al. | 716/19 |
| 6,324,678 B1 | * | 11/2001 | Dangelo et al. | 716/103 |
| 6,578,183 B2 | | 6/2003 | Cheong et al. | |
| 6,651,235 B2 | | 11/2003 | Dai et al. | |
| 6,678,644 B1 | | 1/2004 | Segal | |
| 6,817,005 B2 | * | 11/2004 | Mason et al. | 716/16 |
| 7,143,367 B2 | * | 11/2006 | Eng | 716/2 |
| 2004/0003360 A1 | * | 1/2004 | Batchelor et al. | 716/6 |
| 2009/0271750 A1 | * | 10/2009 | Richardson et al. | 716/6 |

* cited by examiner

*Primary Examiner* — Helen Rossoshek
(74) *Attorney, Agent, or Firm* — Alford Law Group, Inc.; William E. Alford; George L. Fountain

(57) ABSTRACT

A system and method of designing an integrated circuit capable of deriving timing constraints for individual block-level circuits of an integrated circuit that are derived from the chip-level timing constraints and analysis. The block-level timing constraints are in the form of one or more logical timing constraint points at the input and output ports of block-level circuits. Each logical timing constraint points specifies a clock source used to clock data through the port, a delay parameter specifying data propagation delay backward from an input port and forward from an output port, and any timing exception associated with the data path. Using the logical timing constraint point, the circuit design system performs independent timing analysis and optimization of each block-level circuit. The system then reassembles the block-level circuits into a modified chip-level circuit for which timing closure can be achieved.

25 Claims, 9 Drawing Sheets

US 7,926,011 B1

SYSTEM AND METHOD OF GENERATING HIERARCHICAL BLOCK-LEVEL TIMING CONSTRAINTS FROM CHIP-LEVEL TIMING CONSTRAINTS

FIELD OF THE INVENTION

This invention relates generally to integrated circuit design systems, and in particular, to a system and method of generating hierarchical block-level timing constraints from chip-level timing constraints.

BACKGROUND OF THE INVENTION

Integrated circuits have become extremely large and complex, typically including millions of components. It follows then that the design of integrated circuits is also very complex and time consuming, involving synthesizing, analyzing and optimizing many circuit parameters. Because of this complexity, electronic design automation (EDA) systems have been developed to assist designers in developing integrated circuits at multitude levels of abstraction.

In many cases, an integrated circuit under development may be so complex that even EDA systems have difficulties in achieving design closure within a reasonable time period. Thus, there is a need for a system and method to reduce the time required to achieve design closure in the design of integrated circuits.

SUMMARY OF THE INVENTION

The invention is summarized by the claims that follow below.

DETAILED DESCRIPTION OF THE EXEMPLARY EMBODIMENTS

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Figure 1:
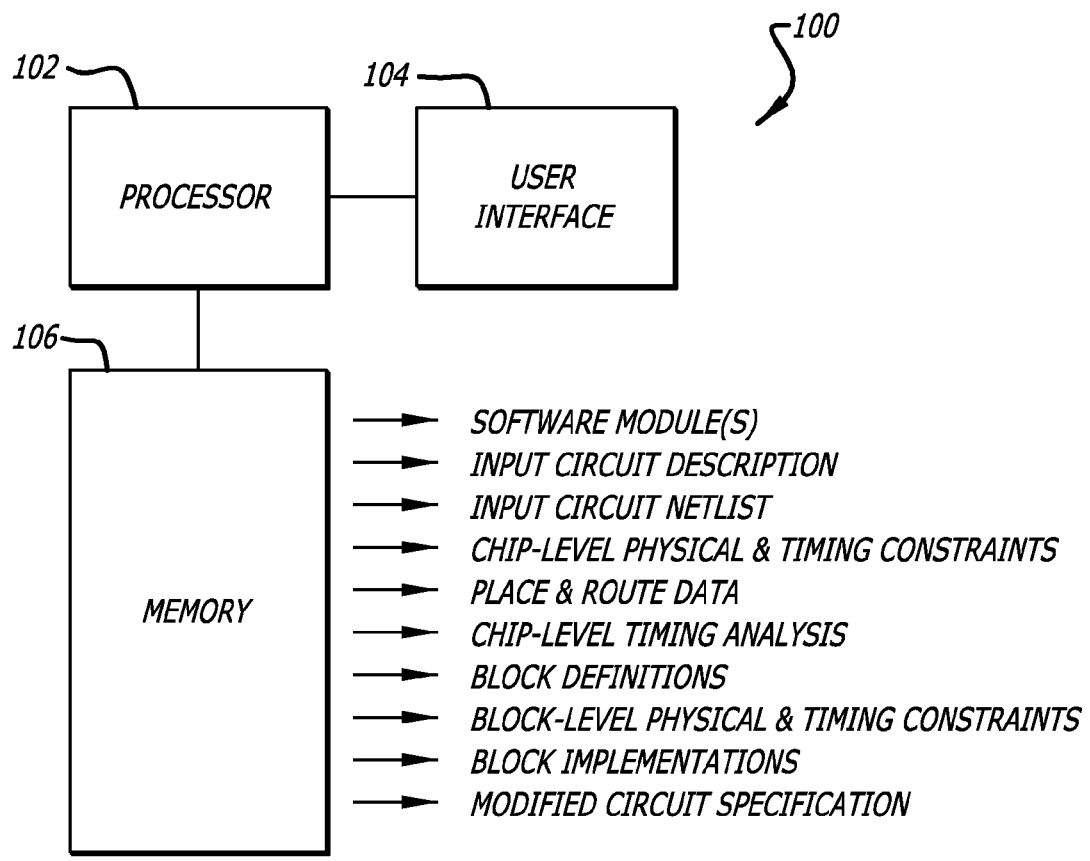
FIG. 1 illustrates a block diagram of an exemplary system for designing integrated circuits in accordance with an embodiment of the invention.

FIG. 1 illustrates a block diagram of an exemplary circuit design system 100 for designing integrated circuits in accordance with an embodiment of the invention. As discussed in more detail below, the circuit design system 100 is capable of generating timing constraints for individual hierarchical blocks of an integrated circuit that are derived from the chip-level timing constraints and analysis. Using the chip-level timing constraints and analysis, the circuit design system 100 is capable of generating block-level timing constraints and analysis to produce block-level circuits that when are assembled into the entire chip, timing closure for the entire chip can be achieved. The block-level timing constraints are in the form of one or more logical timing constraint points associated with a port of a block-level circuit. This is better explained with reference to the following exemplary embodiments.

In particular, the circuit design system 100 may be configured as a computer system comprising one or more processors 102, a user interface 104, and a memory 106. Under the control of one or more software modules, the one or more processors 102 performs the various operations of the circuit design system 100, including logic synthesis, chip-level floor planning, place and route, chip partitioning, block implementation, chip assembly and top-level implementation, and circuit sign-off verification. The one or more processors 102 may be any type of data processing device, including microprocessors, microcontrollers, reduced instruction set computer (RISC) processors, networked computer systems, etc.

The user interface 104 allows a user to send and receive information to and from the processor 102, as well as control the various operations performed by the processor 102. For example, the user interface 104 may comprise one or more input devices, such as a keyboard, a pointing device (e.g., a mouse, a track ball), a touch-sensitive display, microphone, etc. The user interface 104 may also comprise one or more output devices, such as a display (including a touch-sensitive display), speakers, etc. Using the one or more input devices of the user interface 104, a user may specify an input circuit description in any of a number of formats, including in a hardware description language (HDL), such as VHDL or Verilog, or in a resistor-transistor logic (RTL) language. Using one or more output devices of the user interface 104, a user may view the results of the circuit design operation performed by the processor 102. The user may also control the circuit design operations performed by the processor 102 using the user interface 104.

The memory 106 may be any one or more computer readable mediums (e.g., RAM, ROM, magnetic hard disks, optical storage discs, etc.) for storing one or more software modules that control the processor 102 to perform its various operations, as well as information that the processor 102 uses in performing the circuit design process described herein.

Such information may include the input circuit description specified by a user, the input circuit netlist generated by a logic synthesis operation, the chip-level physical and timing constraints, place and route data including chip-level timing analysis generated by a place and route operation, block definitions including block-level physical and timing constraints generated by a chip partitioning operation, block implementations generated by a block implementation operation, and the modified circuit specification generated by a chip assembly and top-level implementation operation, and verified by a circuit sign-off verification operation.

Figure 7:
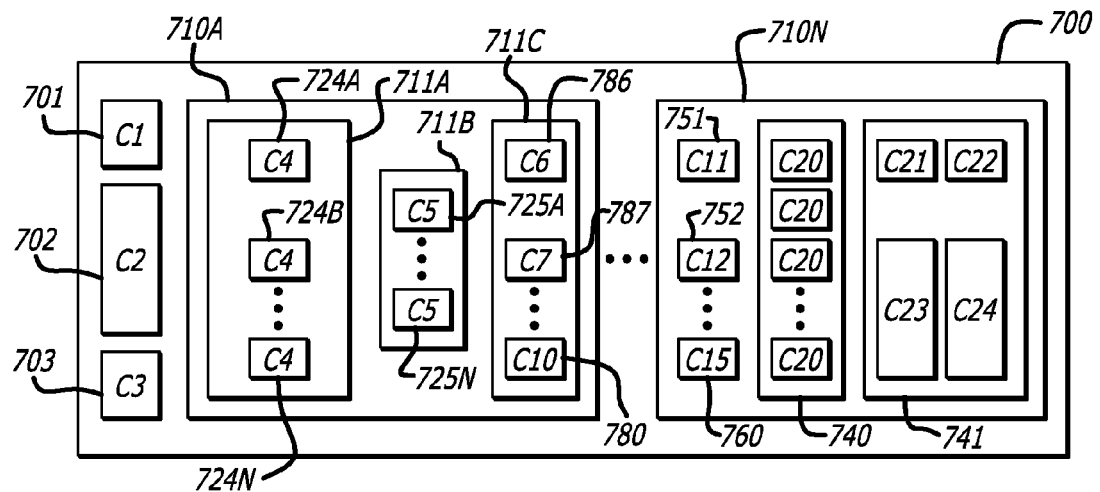
FIG. 7 illustrates a block diagram of an exemplary integrated circuit depicting an exemplary hierarchy of instantiation.
Figure 8:
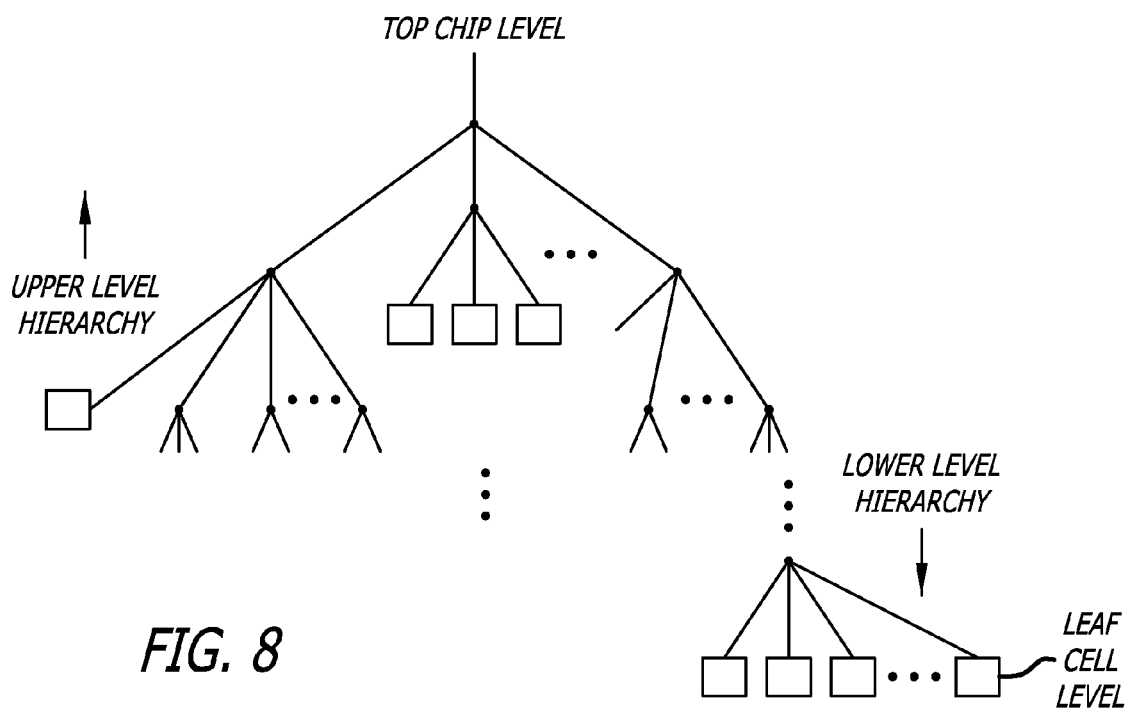
FIG. 8 illustrates an exemplary tree diagram of an integrated circuit illustrating different levels of hierarchy.

Referring now to FIG. 7, the embodiments of the invention are used to design an integrated circuit, such as an exemplary integrated circuit 700. The integrated circuit 700 can be represented in a number of different ways. One representation of the integrated circuit 700 is by a hierarchical netlist with different levels of hierarchy including macro-blocks or modules, blocks, sub-blocks, and leaf-cells or gates. The levels of hierarchy often include a top-level or chip level; one or more block-levels, and a cell or leaf level as illustrated in the exemplary hierarchy tree of FIG. 8. The cells at the leaf cell level of hierarchy may include transistors that may make up one or more logical gates.

At a top-level, the integrated circuit 700 includes one or more cells 701-703 and one or more upper-level blocks 710A-710N, for example. The upper level block 710A may include one or more lower level blocks 711A-711C. The upper level block 710N may include one or more cells 751-760 and one or more lower level blocks 740-741. The lower level blocks may include additional blocks or leaf cells. For example, blocks 711A-711C respectively include leaf cells 724A-724N; leaf cells 725A-725N, and leaf cells 726-730. In a block, the same leaf cell may be instantiated numerous times, such as a D flip flop to make up a register, for example. In block 711A, the same cell C4 is instantiated N times as leaf cells 724A-724N. In another block, different leaf cells may be instantiated depending upon the desired logical functionality.

Alternatively, the integrated circuit 700 may be represented by a flattened netlist of leaf-cells or gates without any added levels of hierarchy. The block level hierarchy is not used so that all design details of the integrated circuit are visible at the top level.

A flattened netlist of an integrated circuit 700 is typically used to perform chip-level timing analysis as entire data paths with their delay elements being more visible. However, timing closure by an EDA tool may be more difficult to obtain with a flattened netlist on an entire integrated circuit. Additionally, one computer system is typically used to perform a timing analysis on a flattened netlist as it is difficult to share the computational load of a flattened netlist with other networked computers. With a limited amount of computer resources, the time to perform a timing analysis of an entire integrated circuit chip may be quite long given today's complicated integrated circuits. In contrast with a hierarchical netlist of an integrated circuit, block-level timing analyses can be independently performed on a block by block basis using block level timing requirements. The block-level timing analyses can be shared amongst a plurality of networked computer systems so that it can be performed independently in parallel and achieve timing results for the overall integrated circuit chip sooner.

Figure 2:
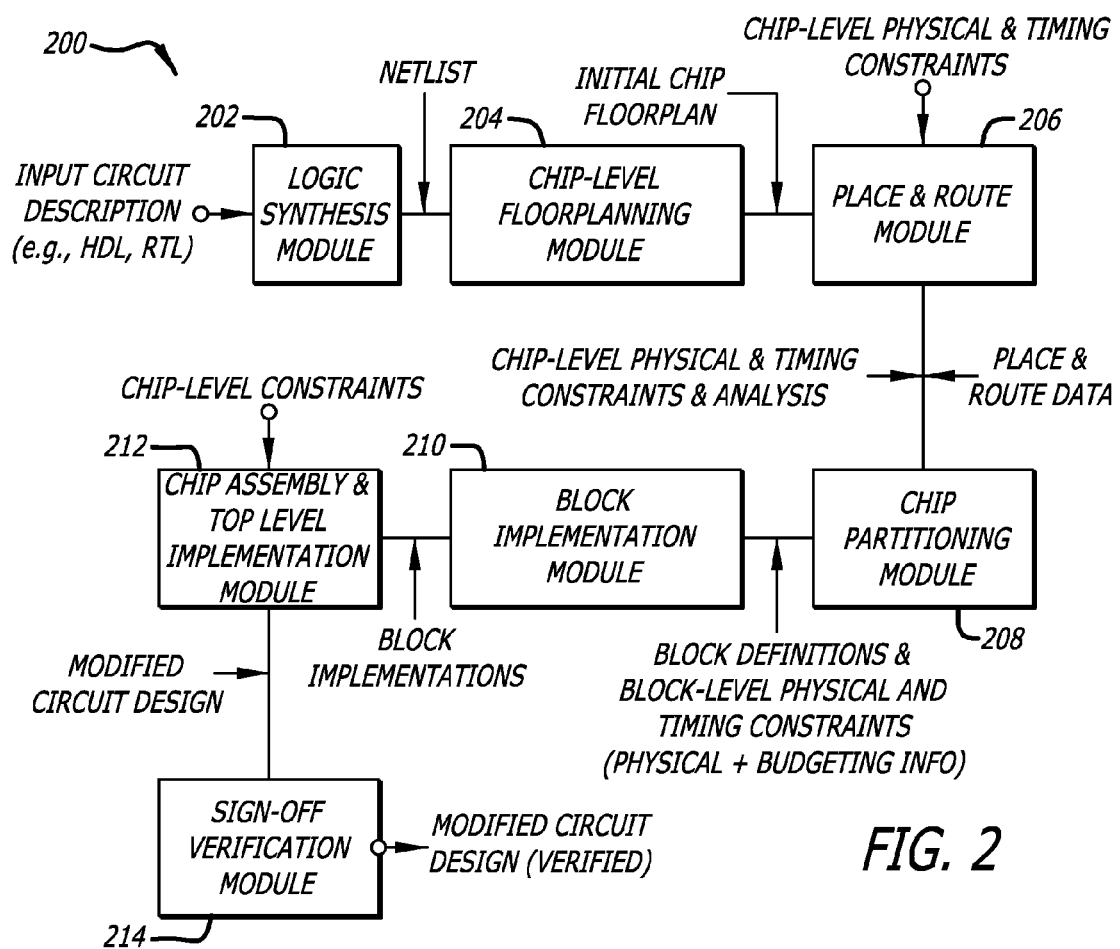
FIG. 2 illustrates a block diagram of exemplary software modules used in the exemplary integrated design system in accordance with another embodiment of the invention.

FIG. 2 illustrates a block diagram of an exemplary software suite 200 used by the circuit design system 100 in performing its circuit design function in accordance with another embodiment of the invention. The software suite 200 includes a logic synthesis module 202, a chip-level floor planning module 204, a place and route module 206, a chip partitioning module 208, a block implementation module 210, a chip assembly and top-level implementation module 212, and a circuit sign-off verification module 214.

The logic synthesis module 202 generates a gate-level netlist from an input circuit description specified by a user using the user interface 104 (FIG. 1). The chip-level floorplanning module 204 generates an initial chip floorplan from the gate-level netlist. The place and route module 206 generates an initial layout for the chip-level circuit using the initial chip floorplan and flat chip-level physical and timing constraints, which may be specified by a user using the user interface 104, and further generates flat chip-level timing constraints. The chip partitioning module 208 partitions the initial chip layout into various hierarchical block-level circuits, and generates block-level physical and timing constraints. The block implementation module 210 generates block implementations from the block definitions and block-level physical and timing constraints. The chip assembly module and top level implementation 212 assembles the block implementations, and may further optimize the assembled chip using chip-level constraints to generate a modified circuit design. The sign-off verification module 214 verifies that the modified circuit design performs to specification.

As discussed in more detail below, the chip partitioning module 208 generates block-level timing constraints for each block-level circuit, that are derived from the flat chip-level timing constraints and analysis. The block-level timing constraints are in the form of logical timing constraint points (hereinafter referred to as "logical TC points") at the data input and/or output ports of each defined block-level circuit. Each logical TC point defines a clock source parameter for specifying a clock governing the propagation of data through a data path that passes through the block port, the delay parameter specifying a data propagation delay at the block port associated with a preceding or following block, and any applicable timing exceptions associated with the data path. Using the logical TC points, the block implementation module 210 performs timing analysis and/or optimization on the individual blocks to obtain implementations for the blocks. The derivation of the logical TC points from the chip-level timing constraints ensures that when the implemented blocks are subsequently assembled into the entire chip by the chip assembly and top level implementation module 210, timing closure for the entire chip can be achieved, and verified by the circuit sign-off verification module 212.

Figure 3A:
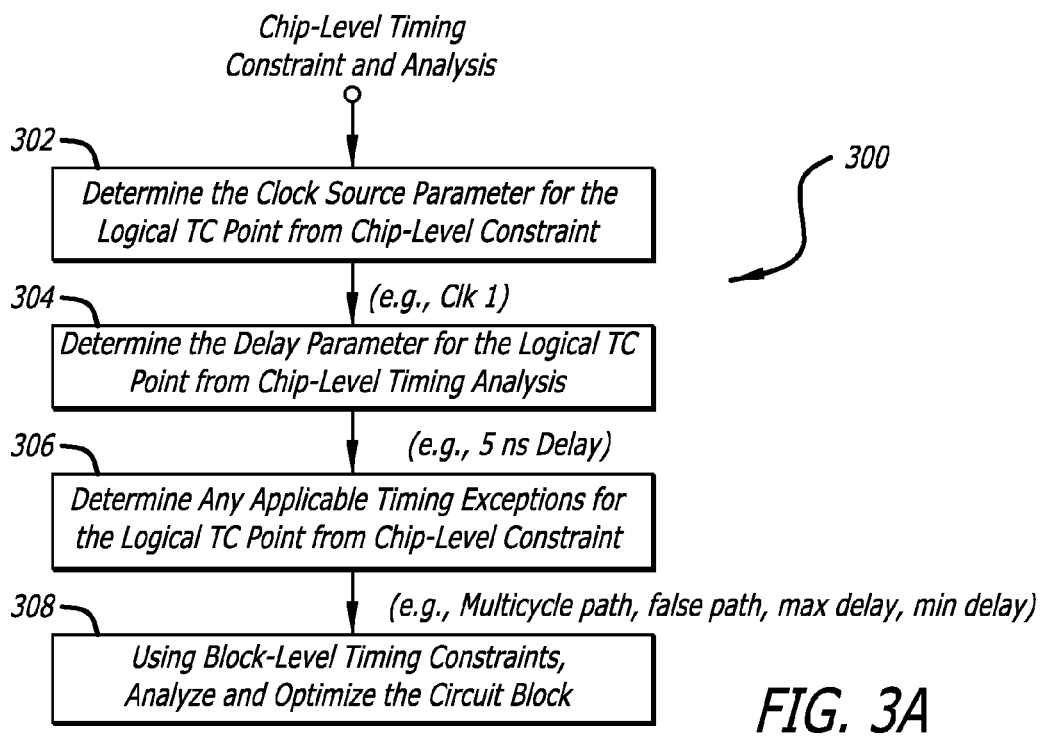
FIG. 3A illustrates a flow diagram of an exemplary method of determining a logical timing constraint point at a port of a hierarchical block-level circuit in accordance with another embodiment of the invention.

FIG. 3A illustrates a flow diagram of an exemplary method 300 of determining a logical TC point for a port of a block-level circuit in accordance with another embodiment of the invention. As alluded to above, the method 300 may be implemented in the chip partitioning module 208 to generate one or more logic TC points for each port of a defined block-level circuit. The one or more logical TC points are derived from the flat chip-level timing constraints and analysis. The method 300 is initially described with reference to the circuit diagrams shown in FIGS. 4A-C.

Figure 4A:
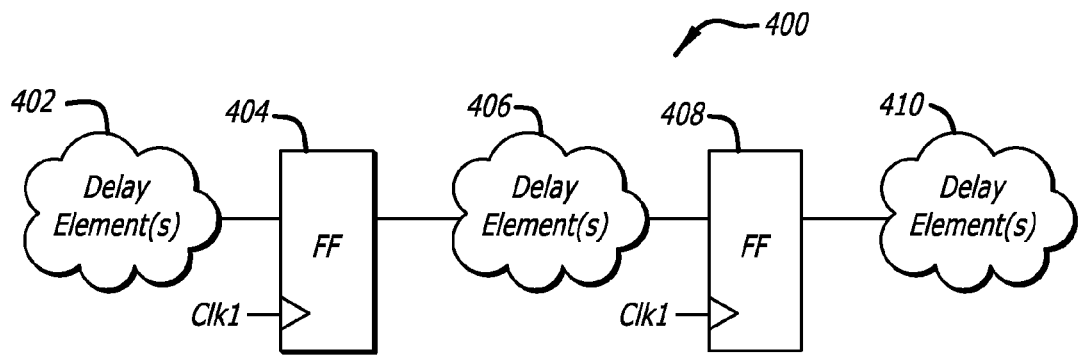
FIGS. 4A-C illustrate schematic diagrams of an exemplary chip-level circuit and corresponding exemplary block-level circuits in accordance with another embodiment of the invention.

FIG. 4A illustrates an exemplary chip-level circuit 400 comprising one or more delay elements 402 coupled to the data input of a register 404, one or more delay elements 406 coupled to the data output of register 404 and to the data input of a register 408, and one or more delay elements 410 at the data output of register 408. The registers 404 and 408 are clocked by the same clock source Clk1. The delay element(s) described herein may include a number of delay elements including gates, combinational logic, transmission lines, capacitive loading, parasitics, etc. Although the registers illustrated herein are D-flip-flops, other types of registers, such as latches may be used in place thereof.

Figure 4B:
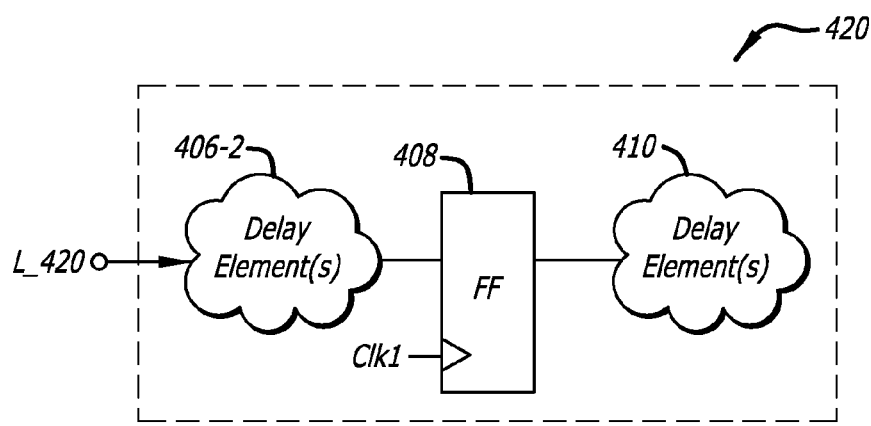

FIG. 4B illustrates an exemplary first block-level circuit 420 being a partition of the chip-level circuit 400. In particular, the first block-level circuit 420 comprises a portion 406-2 of the delay element(s) 406, the register 408, and the delay element(s) 410 of chip-level circuit 400. A logical TC point L_420 has been defined at an input port of the first block-level circuit 420.

Figure 4C:
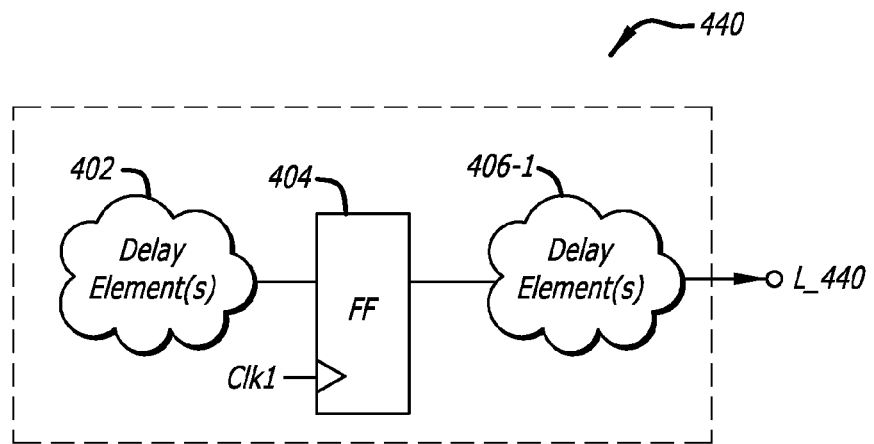

FIG. 4C illustrates a second block-level circuit 440 being another partition of the chip-level circuit 400. In particular, the second block-level circuit 440 comprises the delay element(s) 402, the register 404, and the other portion 406-1 of the delay element(s) 406 of the chip-level circuit 400. A logical TC point L_440 has been defined at an output port of the second block-level circuit 440.

Referring back to FIG. 3A, according to the method 300, the chip partitioning module 208 determines the appropriate clock source parameter for the logical TC point from the flat chip-level constraint (302). If the logical TC point relates to an input port of a block-level circuit, the appropriate clock source would be the clock used to clock data to the input port from a preceding block. In the example of FIGS. 4A-C, the appropriate clock source for logical TC point L_420 is Clk1 since it drives register 404 to clock data from its output to the input port of block-level circuit 420. If the logical TC point relates to an output port of a block-level circuit, the appropriate clock source would be the clock used to drive the register which receives data from the output port. In the example of FIGS. 4A-C, the appropriate clock for logical TC point L_440 is Clk1 since it drives register 408 which receives data from the output port of block-level circuit 440.

Also, according to the method 300, the chip partitioning module 208 determines the appropriate delay parameter for the logical TC point from the flat chip-level constraint (304). In the case that the logical TC point relates to an input port of a block-level circuit, the appropriate delay would be an effective delay related to the actual data propagation delay between the register of the preceding block and the input port of the block-level circuit. An exemplary way of calculating such an effective delay is to multiply the actual data propagation delay between the register of the preceding block-level circuit to the input port, with the ratio of the available data arrival time to the actual data arrival time for the data path between the preceding register and the following register. Taking the logical TC point L_420 of block-level circuit 420 as an example, the delay parameter $Delay_{L\_420}$ of logical TC point L_420 may be given as follows:

$$Delay_{L\_420} = Actual\_Delay_{404-L420} \times Available\_Time_{404-408}/Actual\_Time_{404-408}$$

where $Actual\_Delay_{404-L420}$ is the data propagation delay between register 404 and the input port of block-level circuit 420 (e.g., the actual delay of delay element(s) 406-1), $Available\_Time_{404-408}$ is the available data arrival time for path between the registers 404 and 408, and $Actual\_Time_{404-408}$ is the actual data arrival time between the registers 404 and 408.

In the case that the logical TC point relates to an output port of a block-level circuit, the appropriate delay would be an effective delay related to the actual data propagation delay between output port of the block-level circuit and the register of the following block-level circuit. An exemplary way of calculating such an effective delay is to multiply the actual data propagation delay between the output port of the block-level circuit and the register of the following block-level circuit, with the ratio of the available data arrival time to the actual data arrival time for the data path between the preced-ing register and the following register. Taking the logical TC point L_440 of block-level circuit 440 as an example, the delay parameter $Delay_{L\_440}$ associated with logical TC point L_440 may be given as follows:

$$Delay_{L\_440} = Actual\_Delay_{L440-408} \times Available\_Time_{404-408}/Available\_Time_{404-408}$$

where $Actual\_Delay_{L404-408}$ is the data propagation delay between the logical TC point L_440 and the register 408 (e.g., the actual delay of delay element(s) 406-2), $Available\_Time_{404-408}$ is the available data arrival time for path between the registers 404 and 408, and $Available\_Time_{404-408}$ is the actual data arrival time between the registers 404 and 408.

Further, according to the method 300, the chip partitioning module 208 determines whether there are any applicable timing exceptions associated with the logical TC point from the chip-level constraints (306). For example, the logical TC point may be associated with a multicycle path. In the example of FIGS. 4A-C, the data path between the registers 404 and 408 may be a multicycle path, i.e., the data propagation delay of the path is greater than a clock period of the clock Clk1. Other timing exceptions that the logical TC point may be associated with include false path, max delay, and min delay.

As an example of the derivation of block-level timing constraint from chip-level timing constraint, the chip-level timing constraint file (e.g., an .sdc file) for chip-level circuit 400 may specify a two(2)-cycle multicycle path for the data path between the registers 404 and 408 as follows:

Set_multicycle_path 2-from FF404/Q-to ptn1/FF408/D

Using the chip-level timing constraint, the chip partitioning module 208 may generate the following block-level timing constraints for block-level circuit 420:

Set_input_delay 5-clk clk1_L_420-port In
Set_multicycle_path 2-from clk1_L_420-through In-to ptn1/FF408/D The first command specifies that the logical TC point L_420 at the input port of block-level circuit 420 specifies the clock source Clk1 and has a delay of five (5) nanoseconds. The chip partitioning module 208 may have determined the appropriate clock (e.g., Clk1) and delay (e.g., 5 nanoseconds) from the operations 302 and 304 discussed above. The second command specifies that the path from the logical TC point L_420 to the data input of the register 408 is a two(2)-cycle multicycle path. The chip partitioning module 208 may have determined this timing exception from the operation 306 discussed above.

Similarly, for block-level circuit 440, the chip partitioning module 208 may generate the following block-level constraints:

Set_output_delay 4-clk clk1_L_440-port out
Set_multicycle_path 2-from ptn1/FF404/Q through Out-to clk1_L_440

The first command specifies that the logical TC point L_440 at the output port of block-level circuit 440 specifies a clock source Clk1 and has an output delay of four (4) nanoseconds. The second command specifies that the path from the data output of the register 404 through the logical TC point L_440 is a two(2)-cycle multicycle path. The chip partitioning module 208 may have determined these parameters from the operations 302, 304 and 306 as discussed above.

After the block-level timing constraints have been determined, the block implementation module 210 performs timing analysis and any necessary optimization of the corresponding block-level circuit to meet the block-level timing constraints (308). Taking the block-level circuit 420 as an example, the block implementation module 210 performs timing analysis of the delay element(s) 406-2 using the logical TC point L_420 as a timing constraint. For example, if the delay associated with the logical TC point L_420 is five (5) nanoseconds, and the maximum data propagation delay between registers 404 and 408 is nine (9) nanoseconds, the block implementation module 210 performs timing analysis to determine whether the delay element(s) 406-2 introduces a data propagation delay of four (4) nanoseconds or less. If it does, the block implementation module 210 may not modify the delay element(s) 406-2. If it does not, the block implementation module 210 may optimize the delay element(s) 406-2 so that it introduces a delay of four (4) nanoseconds or less.

Taking the block-level circuit 440 as another example, the block implementation module 210 performs timing analysis of the delay element(s) 406-1 using the logical TC point L_440 as a timing constraint. For example, if the delay associated with the logical TC point L_440 is four (4) nanoseconds, and the maximum data propagation delay between registers 404 and 408 is nine (9) nanoseconds, the block implementation module 210 determines whether the delay element(s) 406-1 has a delay of five (5) nanoseconds or less. If it does, the block implementation module 210 may not modify the delay element(s) 406-1. If it does not, the block implementation module 210 may optimize the delay element(s) 406-2 so that it introduces a data propagation delay of five (5) nanoseconds or less.

In the example of FIGS. 4A-C, the input port of block-level circuit 420 is connected to only a single data path comprising the delay element(s) 406-2. In many cases, the input port may be connected to a plurality of data paths. In such a case, the delay parameter for the logical TC point may be based on the path that has the worst case slack to available data arrival time ratio. This is better explained with reference to the following example.

Figure 5A:
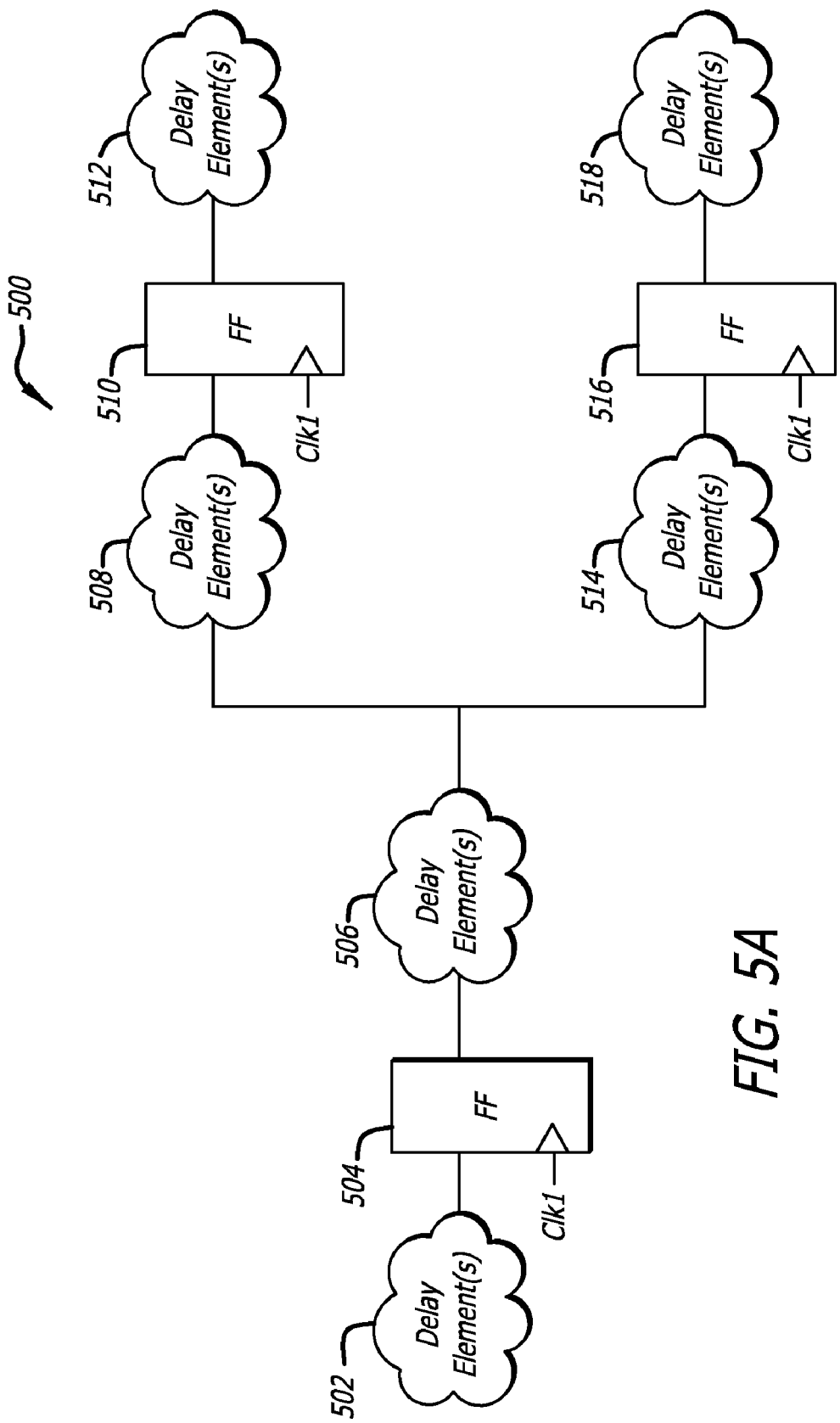
FIGS. 5A-C illustrate schematic diagrams of an exemplary chip-level circuit and corresponding exemplary block-level circuits in accordance with another embodiment of the invention.

FIG. 5A illustrates a block diagram of an exemplary chip-level circuit 500 in accordance with another embodiment of the invention. It shall be understood that the chip-level circuit 500 may comprise substantially more components. The chip-level circuit 500 comprises one or more delay elements 502 coupled to the data input of a register 504; one or more delay elements 506 coupled to the data output of the register 504; one or more delay elements 508 coupled between the delay element(s) 506 and the data input of a register 510; one or more delay elements 512 coupled to the data output of the register 510; one or more delay elements 514 coupled between the delay element(s) 506 and the data input of register 516; and one or more delay elements 518 coupled to the data output of the register 516. In this example, the registers 504, 510, and 516 are clocked by the same clock source Clk1.

Figure 5B:
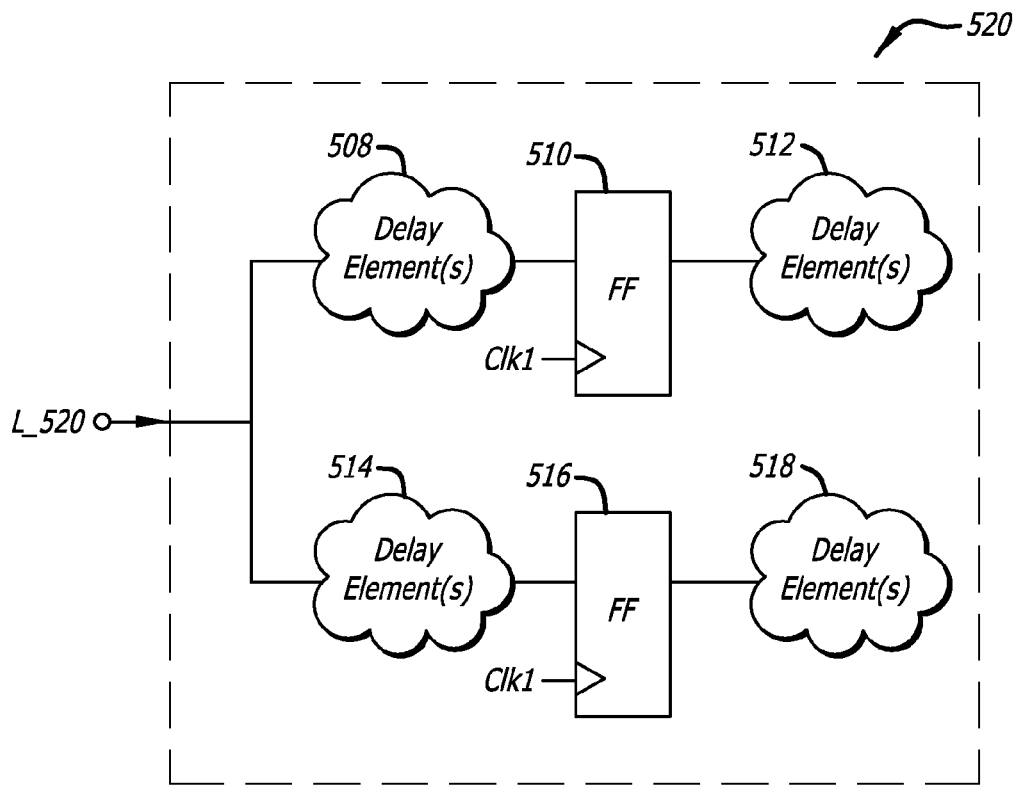

FIG. 5B illustrates a block diagram of an exemplary block-level circuit 520 in accordance with another embodiment of the invention. The block-level circuit 520 is one partition of the chip-level circuit 500, namely the partition to the right of delay element(s) 506. In particular, the block-level circuit 520 comprises delay element(s) 508, register 510, delay element(s) 512, delay element(s) 514, register 516, and delay element(s) 518. A logical TC point L_520 has been defined at the input port of the block-level circuit 520.

Figure 5C:
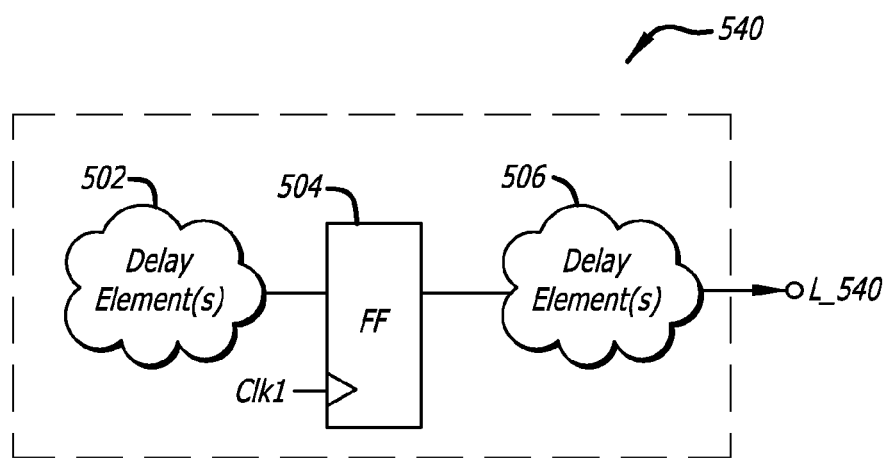

FIG. 5C illustrates a block diagram of an exemplary block-level circuit 540 in accordance with another embodiment of the invention. The block-level circuit 540 is another partition of the chip-level circuit 500, namely the partition to the left of delay elements 508 and 514. In particular, the block-level circuit 540 comprises delay element(s) 502, register 504, and delay element(s) 506. A logical TC point L_540 has been defined at the output port of the block-level circuit 540.

As in the prior example, the chip partitioning module 208 determines the parameters of the logical TC points L_520 and L_540 by performing the operations 302, 304 and 306 previously described with reference to FIG. 3A. In this regard, the chip partitioning module 208 determines the appropriate clock source for the logical TC points L_520 and L_540 (302). As previously discussed, if the logical TC point relates to an input port of a block-level circuit, the appropriate clock source would be the clock source used to clock the data to the input port from a preceding block-level circuit. Accordingly, the appropriate clock source for logical TC point L_520 is Clk1, since it drives register 504 to send the data to the input port of block-level circuit 520. If the logical TC point relates to an output port of a block-level circuit, the appropriate clock source would be the clock used to drive the register of the following block-level circuit which receives the data from the output port. Accordingly, the appropriate clock source for logical TC point L_540 is also Clk1 since it drives registers 510 and 516.

Also, as in the prior example, the chip partitioning module 208 determines the appropriate delay for the logical TC point (304). In the previous example of FIGS. 4A-C, there was only one delay path from register 404 to register 408. In this example, however, there are two delay paths: from register 504 to register 510, and register 504 to register 516. In cases where there are multiple paths, the chip partitioning module 208 chooses the path that has the worst case normalized slack to available data arrival time ratio. This is better explained with reference to the following example.

Figure 3B:
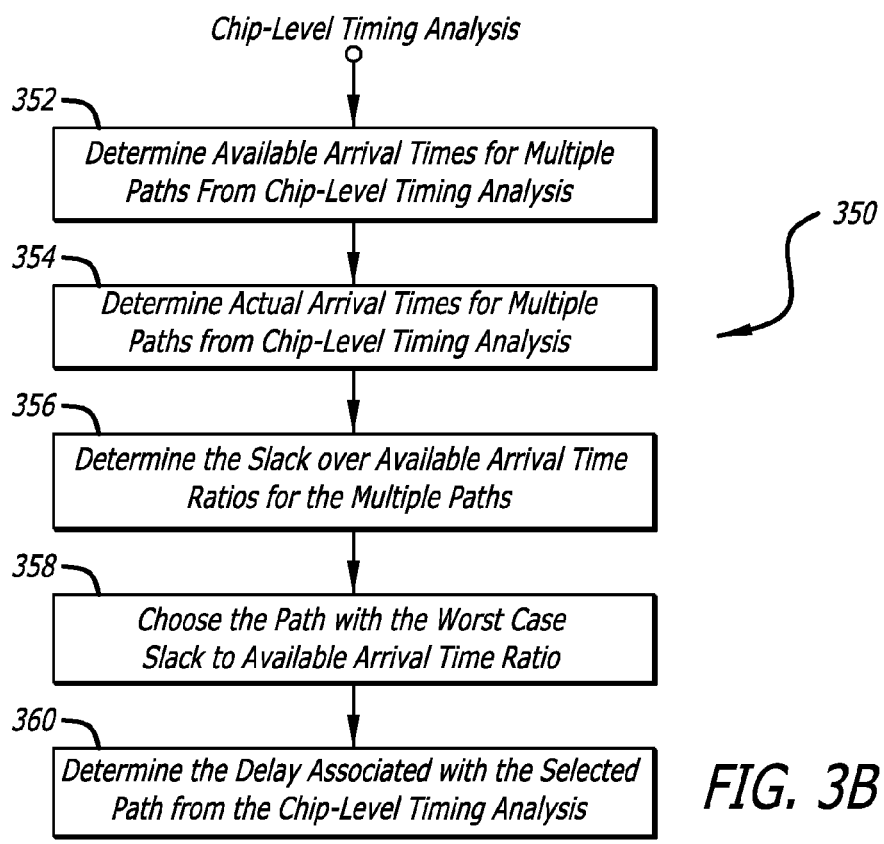
FIG. 3B illustrates a flow diagram of an exemplary method of determining a delay parameter of a logical timing constraint point in accordance with another embodiment of the invention.

FIG. 3B illustrates a flow diagram of an exemplary method 350 of determining a delay parameter of a logical TC point in accordance with another embodiment of the invention. This method 350 applies when there are multiple paths, as in the case of the example of FIGS. 5A-C. According to the method 350, the chip portioning module 208 determines the available data arrival times for the multiple paths based on the flat chip-level timing analysis (352). As an example, the chip partitioning module 208 may have determined that the available data arrival time for the path from register 504 to register 510 is 10 nanoseconds, and the available data arrival time for the path from register 504 to register 516 is eight (8) nanoseconds.

The chip partitioning module 208 also determines the actual data arrival times for the multiple paths from the flat chip-level timing analysis (354). As an example, the chip partitioning module 208 may have determined that the actual data arrival time for the path from register 504 to register 510 is eight (8) nanoseconds, and the actual data arrival time for the path from register 504 to register 516 is seven (7) nanoseconds.

The chip partitioning module 208 then determines the respective slack to available data arrival time ratios for the multiple paths (356). The slack for a data path is equal to the available data arrival time minus the actual data arrival time. Taking the same example, the slack for the data path from register 504 to register 510 is equal to two (2) nanoseconds. Accordingly, the slack over available arrival time ratio for this path is 1/5. The slack for the data path from register 504 to 516 is equal to one (1) nanosecond. Accordingly, the slack over available arrival time ratio for this path is 1/8.

The chip partitioning module 208 then determines the path having the worst case slack to available arrival time ratio (358). In this example, the path having the worst slack to available arrival time ratio is the path from register 504 to 516 since its ratio (1/8) is less than the ratio (1/5) of the path from register 504 to 510. Accordingly, the chip partitioning module 208 selects the path from register 504 to 516 for the purpose of calculating the appropriate delay for the logical TC point L_520.

Using the data path having the worst case slack to available arrival time ratio, the chip partitioning module 208 determines the delay associated with the selected path (360). The delay for the logical TC point L_520 is given as follows:

$$Delay_{L\_520} = Actual\_Delay_{504-L520} \times Available\_Time_{504-516}/Available\_Time_{504-516}$$

Assuming the Actual_Delay$_{504-L520}$ (e.g., the actual delay of delay element(s) 506) is three (3) nanoseconds, the Delay$_{L\_520}$ for logical TC point L_520 is 24/7 (3.86) nanoseconds.

Assuming the slack for path 504 to 516 is less than the slack for path 504 to 510, the delay for the logical TC point L_540 is given as follows:

$$Delay_{L\_540} = Actual\_Delay_{L540-516} \times Available\_Time_{504-516}/Available\_Time_{504-516}$$

Assuming the Actual_Delay$_{L540-516}$ (e.g., the actual delay of delay element(s) 514) is four (4) nanoseconds, the Delay$_{L\_540}$ for logical TC point L_540 is 32/7 (4.57) nanoseconds.

Further, according to the method 300, the chip partitioning module 208 determines whether there are any applicable timing exceptions associated with the logical TC point from the chip-level constraints (306). For example, the logical TC point may be associated with a multicycle path. In the example of FIGS. 5A-C, the data paths between registers 504 and 510, and between registers 504 and 516 may be multi-cycle paths. Other timing exceptions that the logical TC point may be associated with include false path, max delay, and min delay.

As an example of the derivation of block-level timing constraint from chip-level timing constraint, the chip-level timing constraint file (e.g., an .sdc file) for chip-level circuit 500 may specify multicycle paths for the data paths between the registers 504 and 510, and 504 and 516 as follows:

Set_multicycle_path 2-from FF504/Q-to ptn1/FF510/D
Set_multicycle_path 3-from FF504/Q-to ptn1/FF516/D Using the chip-level timing constraint, the chip partitioning module 208 may generate the following block-level timing constraints for block-level circuit 520:

Set_input_delay 3.86-clk clk1_L_520-port In
Set_multicycle_path 2-from clk1_L_520-through In-to ptn1/FF510/D
Set_multicycle_path 3-from clk1_L_520-through In-to ptn1/FF516/D The first command specifies that the logical TC point L_520 at the input port of block-level circuit 520 uses clock source Clk1 and has an initial delay of 3.86 nanoseconds. The chip partitioning module 208 may have determined the appropriate clock (e.g., Clk1) and delay (e.g., 3.86 nanoseconds) from the operations 302 an 304 discussed above. The second command specifies that the path through the logical TC point L_520 to the data input of the register 510 is a two (2)-cycle multicycle path. The third command specifies that the path through the logical TC point L_520 to the data input of the register 516 is a three (3)-cycle multicycle path. The chip partitioning module 208 may have determined this timing exception from the operation 306 discussed above.

Similarly, for block-level circuit 540, the chip partitioning module 208 may generate the following block-level constraints:

Set_output_delay 4.57-clk clk1_L_540-port out
Set_multicycle_path 2-from ptn1/FF504/Q-through out-to clk1_L_540

The first command specifies that the logical TC point L_540 at the output port of block-level circuit 540 uses the clock source Clk1 and has an output delay of 4.57 nanoseconds. The second command specifies that the path from the data output of the register 504 through the logical TC point L_540 is a multicycle path. The chip partitioning module 208 may have determined these parameters from the operations 302, 304 and 306 as discussed above.

After the block-level timing constraints have been determined, the block implementation module 210 performs timing analysis and any necessary modification of the corresponding block-level circuit to meet the block-level timing constraints (308). Taking the block-level circuit 520 as an example, the block implementation module 210 performs timing analysis of the delay elements 508 and 514 with the logical TC point L_520 as a timing constraint. For example, based on an initial delay of 3.86 nanoseconds, the block implementation module 210 performs timing analysis to determine whether the delay elements 508 and 514 meet timing requirements, or require modification to meet timing requirements.

Similarly, the block implementation module 210 performs timing analysis of the delay element(s) 506 with the logical TC point L_540 as a timing constraint. For example, based on an initial delay of 4.57 nanoseconds, the block implementation module 210 performs timing analysis to determine whether the delay elements 506 meet timing requirements, or require modification to meet timing requirements.

In the example of FIGS. 5A-C, the input port of block-level circuit 520 is connected to two (2) paths including respectively delay elements 508 and 514, while the output port of block-level circuit 540 is connected to a single path including delay element(s) 506. In some cases, both the input and output ports of adjacent block-level circuits are connected to a plurality of data paths. Additionally, in the example of FIGS. 5A-C, a single clock source Clk1 is used to drive registers 504, 510, and 516. In some cases, registers may be clocked with different clock sources. The following example illustrates block-level circuits including respective input and output ports coupled to a plurality of data paths, as well as registers driven by different clock sources.

Figure 6A:
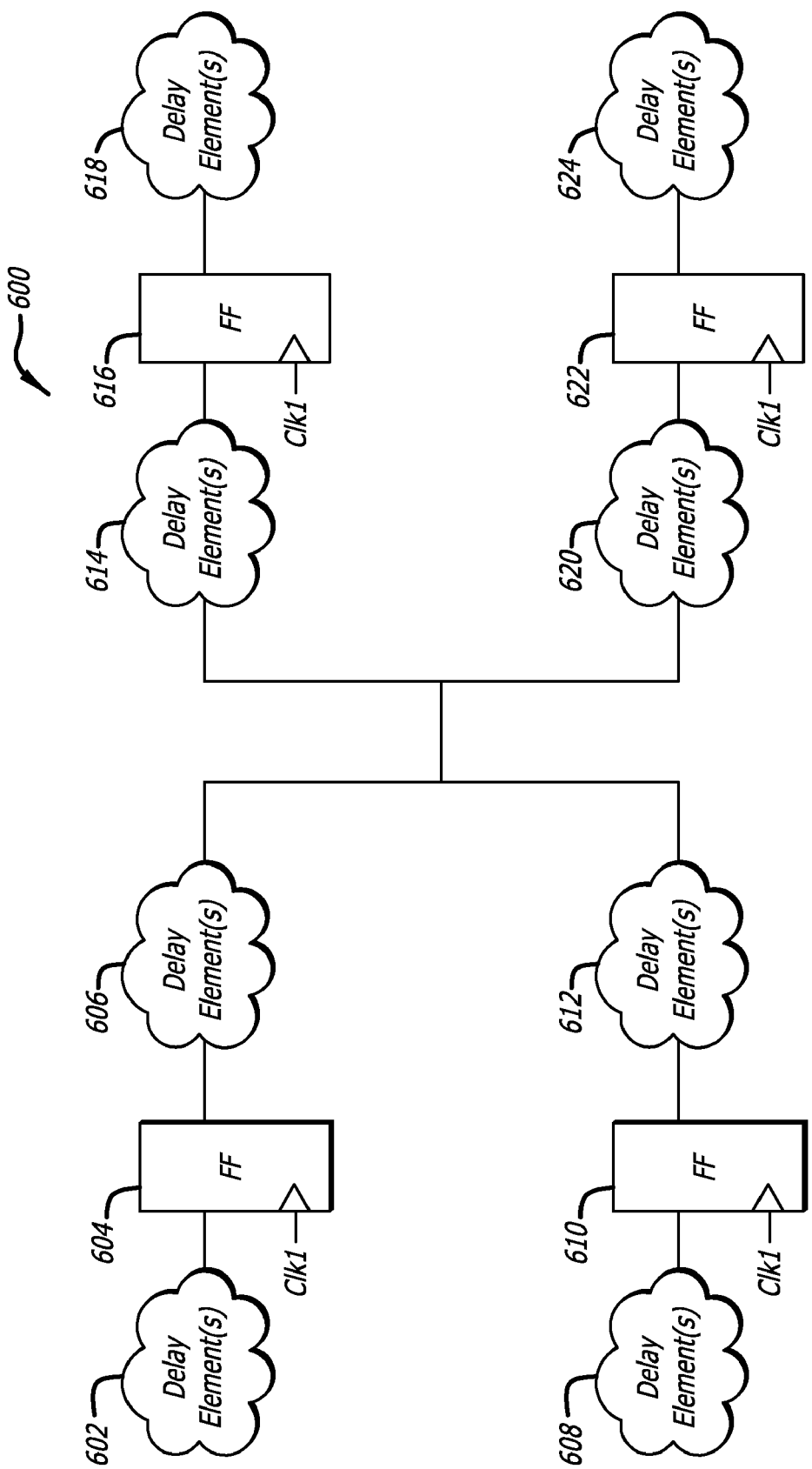
FIGS. 6A-C illustrate schematic diagrams of an exemplary chip-level circuit and corresponding exemplary block-level circuits in accordance with another embodiment of the invention.

FIG. 6A illustrates a block diagram of an exemplary chip-level circuit 600 in accordance with another embodiment of the invention. It shall be understood that the chip-level circuit 600 may comprise substantially more components. The chip-level circuit 600 comprises one or more delay elements 602 coupled to the data input of a register 604; one or more delay elements 606 coupled to the data output of the register 604; one or more delay elements 608 coupled to the data input of a register 610; and one or more delay elements 612 coupled to the data output of the register 610. The chip-level circuit 600 further comprises one or more delay elements 614 coupled to the data input of a register 616; one or more delay elements 618 coupled to the data output of the register 618; one or more delay elements 620 coupled to the data input of a register 622; and one or more delay elements 624 coupled to the data output of the register 622. The delay elements 606 and 612 are coupled to delay elements 614, and 620. In this example, the registers 604, 616, and 622 are clocked by the same clock source Clk1, and register 610 is clocked by clock source Clk2.

Figure 6B:
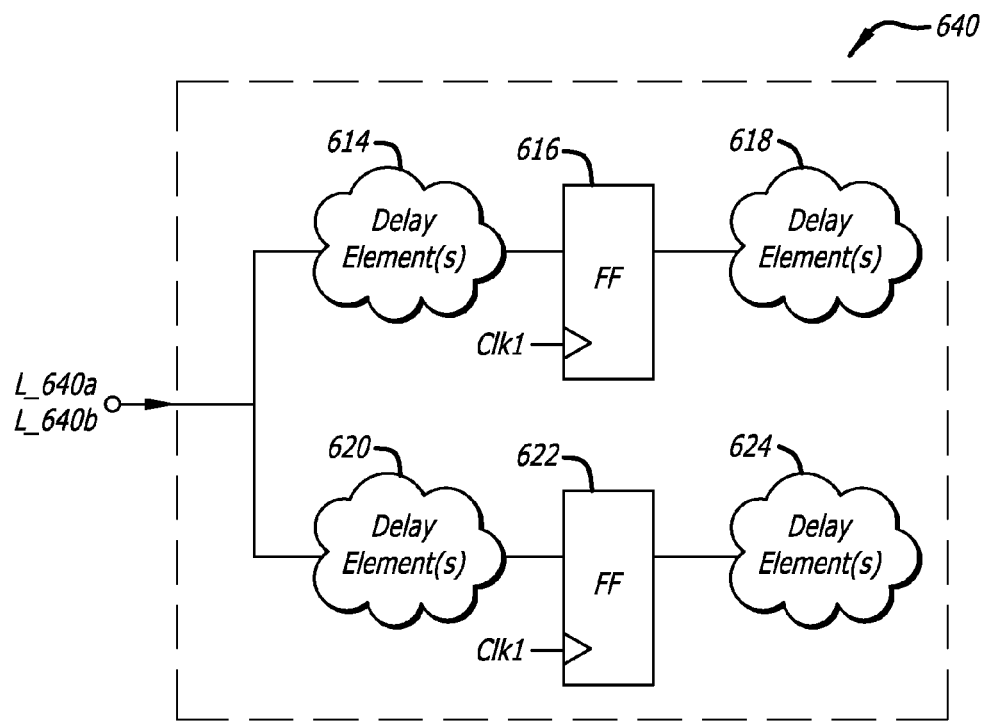

FIG. 6B illustrates a block diagram of an exemplary block-level circuit 640 in accordance with another embodiment of the invention. The block-level circuit 640 is one partition of the chip-level circuit 600, namely the partition to the right of delay elements 606 and 612. In particular, the block-level circuit 620 comprises delay element(s) 614, register 616, delay element(s) 618, delay element(s) 620, register 622, and delay element(s) 624. A pair of logical TC points L_640*a* and L640*b* have been defined at the input port of the block-level circuit 640.

Figure 6C:
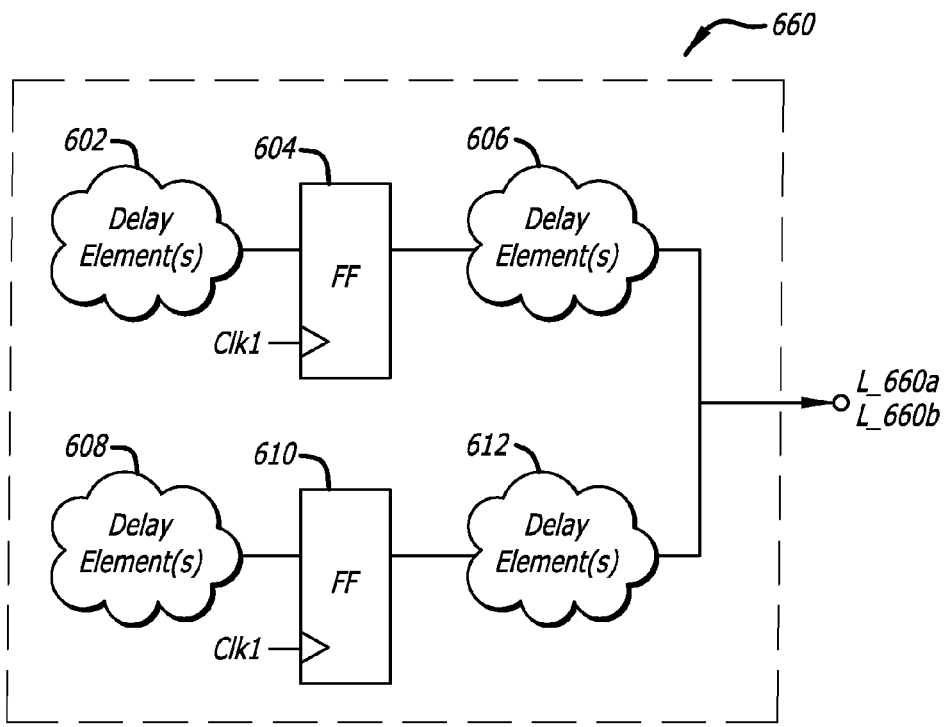

FIG. 6C illustrates a block diagram of an exemplary block-level circuit 660 in accordance with another embodiment of the invention. The block-level circuit 660 is another partition of the chip-level circuit 600, namely the partition to the left of delay elements 614 and 620. In particular, the block-level circuit 660 comprises delay element(s) 602, register 604, delay element(s) 606, delay element(s) 608, register 610, and delay element(s) 612. A pair of logical TC points L_660*a* and L_660*b* have been defined at the output port of the block-level circuit 660.

As in the prior examples, the chip partitioning module 208 determines the parameters of the logical TC points L_640*a-b* and L_660*a-b* by performing the operations 302, 304 and 306 previously described. In particular, the chip partitioning module 208 determines the appropriate clock source for the logical TC points L_640*a-b* and L_660*a-b* (302). As previously discussed, if the logical TC point relates to an input port of a block-level circuit, the appropriate clock source would be the clock source used to clock data to the input port from the preceding block-level circuit. However, in this example, there are two different clock sources Clk1 and Clk2 that clock data to the input port of block-level circuit 640. This is the reason that two logical TC points L_640*a-b* are defined for the input port of block-level circuit 640. Accordingly, the appropriate clock source for logical TC point L_640*a* is Clk1, and the appropriate clock source for logical TC point L_640*b* is Clk2.

If the logical TC point relates to an output port of a block-level circuit, the appropriate clock source would be the clock used to drive the register of the following block-level circuit. In this example, a single clock source Clk1 drives the registers 616 and 622 of the following block-level circuit 660. Accordingly, the appropriate clock source for logical TC points L_660*a-b* is Clk1. However, since two different clock source are used to propagate data through the output port of block-level circuit 660, two logical TC points L_660*a-b* are defined for the output port.

Also, as in the prior examples, the chip partitioning module 208 determines the appropriate delay for the logical TC point (304). With regard to block-level circuit 640, there are two data paths for logical TC point L_640*a*: from register 604 to register 616, and from register 604 to register 622. Also, there are two data paths for logical TC point L_640*b*: from register 610 to register 616, and from register 610 to register 622. However, in this example, the flat chip-level constraints have defined the path from register 610 to register 622 as a false path. Thus, logical TC point L_640*b* effectively has only a single delay path from register 610 to register 616.

As previously discussed, in cases where there are multiple paths, the block implementation module 210 chooses the path that has the worst case slack to available arrival time ratio. For the logical TC point L_640*a*, the chip partitioning module 208 performs the operations 352-358 of the method 350 to determine the path with the worst case slack to available arrival time ratio, and operation 360 to determine the appropriate delay for the logical TC point L_640*a* using the chosen path. For the logical TC point L_640*b*, the chip partitioning module 208 need only perform the operation 360 for the single path to determine the appropriate delay for the logical TC point L_640*b*. This is because the false path from register 610 to register 622 is not considered.

With regard to block-level circuit 660, there are two data paths for logical TC point L_660*a*: from register 604 to register 616, and from register 610 to register 616. Also, there are two delay paths for logical TC point L_660*b*: from register 604 to register 622, and from register 610 to register 622. However, as previously discussed, the flat chip-level constraints have defined the path from register 610 to register 622 as a false path. Thus, logical TC point L_660*b* effectively has only a single data path from register 604 to register 616.

As discussed above, in cases of multiple paths, the chip partitioning module 208 chooses the path that has the worst case slack to available arrival time ratio. For the logical TC point L_660*a*, the chip partitioning module 208 performs the operations 352-358 of the method 350 to determine the path with the worst case slack to available arrival time ratio, and operation 360 to determine the appropriate delay for the logical TC point L_660*a* using the chosen path. For the logical TC point L_660*b*, the chip partitioning module 208 need only perform the operation 360 for the single path to determine the appropriate delay for the logical TC point L_660*b*.

The chip partitioning module 208 also determines whether there are any applicable timing exceptions associated with the logical TC point from the chip-level constraints (306). In this example, the chip-level constraints have defined the path from register 610 to register 622 as a false path. For illustration purposes, the chip-level constraints may have defined the remaining paths as multicycle paths.

According to the above example, the chip-level timing constraint file (e.g., an .sdc file) for chip-level circuit 600 may specify the following:
Set_multicycle_path 2-from FF604/Q-to ptn1/FF616/D
Set_multicycle_path 3-from FF604/Q-to ptn1/FF622/D
Set_multicycle_path2-from FF610/Q-to ptn1/FF616/D
Set_false_path-from FF610/Q-to ptn1/FF622/D Assuming the delays determined for logical TC points L_640*a-b* are five (5) and eight (8) nanoseconds, respectively, the chip partitioning module 208 may generate the following block-level timing constraints for block-level circuit 640:
Set_input_delay 5-clk clk1_L_640*a*-port In
Set_multicycle_path 2-from clk1_L_640*a*-through In-to ptn1/FF616/D
Set_multicycle_path 3-from clk1_L_640*a*-through In-to ptn1/FF622/D
Set_input_delay 8-clk clk2_L_640*b*-port In
Set_multicycle_path 2-from clk2_L_640*b*-through In-to ptn1/FF616/D
Set_false_path-from clk2_L_640*b*-through In-to ptn1/FF622/D The first command specifies that the logical TC point L_640*a* uses a clock source Clk1 and has an initial delay of five (5) nanoseconds. The second command specifies that the path from the logical TC point L_640*a* to the data input of the register 616 is a two (2)-cycle multicycle path. The third command specifies that the path from the logical TC point L_640*a* to the data input of the register 622 is a three (3)-cycle multicycle path. The fourth command specifies that the logical TC point L_640*b* uses a clock source Clk2 and has an initial delay of eight (8) nanoseconds. The fifth command specifies that the path from the logical TC point L_640*b* to the data input of the register 616 is a two (2)-cycle multicycle path. The sixth command specifies that the path from the logical TC point L_640*b* to the data input of the register 622 is a false path.

After the block-level timing constraints for block-level circuit 640 have been determined, the block implementation module 210 performs timing analysis and any necessary optimization of the corresponding block-level circuit using the block-level timing constraints (308). In this regard, the block implementation module 210 performs timing analysis of the delay elements 614 and 620 using logical TC points L_640*a* and L640*b* as timing constraints. For example, based on input delays of five (5) and eight (8) nanoseconds, the block implementation module 210 performs timing analysis to determine whether the delay elements 614 and 620 meet timing requirements, or require modifying them to meet timing requirements.

With regard to block-level circuit 660, it is assumed that the delays determined for logical TC points L660a-b are six (6) and nine (9) nanoseconds, respectively. Accordingly, the chip partitioning 208 may generate the following block-level constraints:

Set_output_delay 6-clk clk1_L_660a-port Out
    Set_multicycle_path 2-from ptn1/FF604/Q-through out-to clk1_L_660a
    Set_multicycle_path 3-from ptn1/FF610/Q-through out-to clk1_L_660a
    Set_output_delay 9-clk clk1_L_660b-port Out
    Set_multicycle_path 2-from ptn1/FF604/Q-through out-to clk1_L_660b
    Set_false_path-from ptn1/FF610/Q-through out-to clk1_L_660b The first command specifies that the logical TC point L_660a uses the clock source Clk1 and has an output delay of six (6) nanoseconds. The second command specifies that the path from the output of register 604 to logical TC point L_660a is a two (2)-cycle multicycle path. The third command specifies that the path from the output of register 610 to logical TC point L_660a is a three (3)-cycle multicycle path. The fourth command specifies that the logical TC point L_660b uses the clock source Clk1 and has an output delay of nine (9) nanoseconds. The fifth command specifies that the path from the output of register 604 to the logical TC point L_660b is a two (2)-cycle multicycle path. The sixth command specifies that the path from the output of register 610 to the logical TC point L_660b is a false path.

After the block-level timing constraints for block-level circuit 660 have been determined, the block implementation module 210 performs timing analysis and any necessary optimization of the corresponding block-level circuit to meet the block-level timing constraints (308). In this regard, the block implementation module 210 performs timing analysis of the delay elements 606 and 612 using the logical TC points L_660a and L660b as timing constraints. For example, based on input delays of six (6) and nine (9) nanoseconds, the block implementation module 210 performs timing analysis to determine whether the delay elements 606 and 612 meet timing requirements, or modifies them to meet timing requirements.

Although the partitioning of the chip-level circuit design into block-level circuit design was used to exemplify an embodiment of the invention, it shall be understood that the partitioning can occur at any level of abstraction. For example, the chip-level circuit design may have been partitioned into at least one first-level circuit design, and corresponding first-level timing constraints may have been generated. Then, the first-level circuit design may, in turn, have been partitioned into at least one second-level circuit design. In this case, the determination of a logical TC point for a port of the second-level circuit design may come from the timing constraints of the first-level circuit design, and not necessarily from the chip-level timing constraints.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of designing a circuit, the method comprising:
receiving top chip level timing constraints for a top chip level circuit design;
with a processor, partitioning the top chip level circuit design into at least a first lower-level circuit design and a second lower-level circuit design;
with a processor, determining a logical timing constraint point for a port of the first lower-level circuit design in response to the top chip level timing constraints of the top chip level circuit design, wherein the logical timing constraint point includes
a clock source parameter specifying a clock source governing data propagation over a data path through the port and
a delay parameter specifying a data propagation delay over a portion of the data path; and
with a processor, after determining the logical timing constraint point, optimizing the first lower-level circuit design to implement the first lower-level circuit design and performing a lower level timing analysis on the implementation of the first lower-level circuit design using the logical timing constraint point to determine if the implementation of the first lower-level circuit design meets the data propagation delay specified by the delay parameter of the logical timing constraint point.

2. The method of claim 1, wherein
if the port is an input port then the clock source parameter specifies a clock source that drives a register to clock data into the input port, and
if the port is an output port then the clock source parameter specifies a clock source that drives a register to receive data from the output port.

3. The method of claim 1, wherein
if the port is an input port then the data propagation delay specified by the delay parameter is over the portion of the data path from an output of a register to the input port, and
if the port is an output port then the data propagation delay specified by the delay parameter is over the portion of the data path from the output port to an input of a register.

4. The method of claim 1, wherein
the port is an input port, and
the delay parameter is related to an actual data propagation delay from an output of a preceding register to the input port adjusted by an available data arrival time between the preceding register and a following register, and by an actual data arrival time between the preceding register and the following register.

5. The method of claim 1, wherein
the port is an input port with a plurality of data paths passing through the input port, and
the delay parameter is related to a data propagation delay from an output of a register to the input port associated with a worst case data path having a worst case slack to available data arrival time ratio among the plurality of data paths passing through the input port.

6. The method of claim 5, further comprising:
determining the worst case data path from the plurality of data paths passing through the input port including:
determining an available data arrival time for each of the data paths from a higher-level timing analysis of a higher-level circuit design including the first lower level circuit design;

determining an actual data arrival time for each of the data paths from the higher-level timing analysis of the higher-level circuit design;

determining a slack for each of the data paths from corresponding available data arrival time and actual data arrival time;

determining a slack to available data arrival time ratio for each of the data paths from corresponding slack and available data arrival time; and selecting the data path having the worst case slack to available data arrival time ratio as the worst case data path.

7. The method of claim 1, wherein
the port is an output port, and
the delay parameter is related to an actual data propagation delay from the output port to a following register adjusted by an available data arrival time between a preceding register and the following register, and by an actual data arrival time between the preceding register and the following register.

8. The method of claim 1, wherein
the port is an output port with a plurality of data paths passing through the output port, and
the delay parameter is related to a data propagation delay from the output port to an input of a register associated with a worst case data path having a worst case slack to available data arrival time ratio among the plurality of data paths passing through the output port.

9. The method of claim 8, further comprising:
determining the worst case data path from the plurality of data paths passing through the output port including
determining an available data arrival time for each of the data paths from a higher-level timing analysis of a higher-level circuit design including the first lower level circuit design;

determining an actual data arrival time for each of the data paths from the higher-level timing analysis of the higher-level circuit design;

determining a slack for each of the data paths from corresponding available data arrival time and actual data arrival time;

determining slack to available data arrival time ratio for each of the data paths from corresponding slack and available data arrival time; and selecting the data path having the worst case slack to available time ratio as the worst case data path.

10. The method of claim 1, wherein
the logical timing constraint point further including a timing exception parameter related to one or more of the following: a multicycle path, a false path, a maximum delay, and a minimum delay associated with the data path passing through the port of the first lower-level circuit design.

11. The method of claim 1, further comprising:
if the lower-level timing analysis determines that the lower-level timing of the first lower-level circuit design is not met,
then modifying the first lower-level circuit design to generate a modified lower-level circuit design to meet the lower-level timing.

12. A method of designing a circuit, the method comprising:
receiving top chip level timing constraints for a top chip level circuit design;
with a processor, partitioning the top chip level circuit design into at least a first lower-level circuit design and a second lower-level circuit design;

with a processor, determining a logical timing constraint point for a port of the first lower-level circuit design from the top chip level timing constraints of the top chip level circuit design, wherein the logical timing constraint point includes a clock source parameter specifying a clock source governing data propagation over a data path through the port and a delay parameter specifying a data propagation delay over a portion of the data path;

with a processor, performing a lower level timing analysis of the first lower-level circuit design using the logical timing constraint point to determine if lower-level timing of the first lower-level circuit design is met;

if the lower-level timing analysis determines that the lower-level timing of the first lower-level circuit design is not met, then modifying the first lower-level circuit design to generate a modified lower-level circuit design to meet the lower-level timing;

wherein a plurality of lower-level circuit designs are modified to generate a plurality of modified lower-level circuit designs; and the method further comprises:
assembling the plurality of modified lower-level circuit designs to form a modified top chip level circuit design; and
verifying functional requirements of the modified top chip level circuit design.

13. The method of claim 12, wherein
if the port is an input port then the clock source parameter specifies a clock source that drives a register to clock data into the input port, and
if the port is an output port then the clock source parameter specifies a clock source that drives a register to receive data from the output port.

14. The method of claim 12, wherein
if the port is an input port then the data propagation delay specified by the delay parameter is over the portion of the data path from an output of a register to the input port, and
if the port is an output port then the data propagation delay specified by the delay parameter is over the portion of the data path from the output port to an input of a register.

15. The method of claim 12, wherein
the port is an input port, and
the delay parameter is related to an actual data propagation delay from an output of a preceding register to the input port adjusted by an available data arrival time between the preceding register and a following register, and by an actual data arrival time between the preceding register and the following register.

16. The method of claim 12, wherein
the port is an input port with a plurality of data paths passing through the input port, and
the delay parameter is related to a data propagation delay from an output of a register to the input port associated with a worst case data path having a worst case slack to available data arrival time ratio among the plurality of data paths passing through the input port.

17. The method of claim 16, further comprising:
determining the worst case data path from the plurality of data paths passing through the input port including:
determining an available data arrival time for each of the data paths from a higher-level timing analysis of a higher-level circuit design including the first lower level circuit design;
determining an actual data arrival time for each of the data paths from the higher-level timing analysis of the higher-level circuit design;

determining a slack for each of the data paths from corresponding available data arrival time and actual data arrival time;

determining a slack to available data arrival time ratio for each of the data paths from corresponding slack and available data arrival time; and selecting the data path having the worst case slack to available data arrival time ratio as the worst case data path.

18. The method of claim 12, wherein the port is an output port, and the delay parameter is related to an actual data propagation delay from the output port to a following register adjusted by an available data arrival time between a preceding register and the following register, and by an actual data arrival time between the preceding register and the following register.

19. The method of claim 12, wherein the port is an output port with a plurality of data paths passing through the output port, and the delay parameter is related to a data propagation delay from the output port to an input of a register associated with a worst case data path having a worst case slack to available data arrival time ratio among the plurality of data paths passing through the output port.

20. The method of claim 19, further comprising:

determining the worst case data path from the plurality of data paths passing through the output port including determining an available data arrival time for each of the data paths from a higher-level timing analysis of a higher-level circuit design including the first lower level circuit design;

determining an actual data arrival time for each of the data paths from the higher-level timing analysis of the higher-level circuit design;

determining a slack for each of the data paths from corresponding available data arrival time and actual data arrival time;

determining slack to available data arrival time ratio for each of the data paths from corresponding slack and available data arrival time; and selecting the data path having the worst case slack to available time ratio as the worst case data path.

21. The method of claim 12, wherein the logical timing constraint point further including a timing exception parameter related to one or more of the following: a multicycle path, a false path, a maximum delay, and a minimum delay associated with the data path passing through the port of the first lower-level circuit design.

22. A computer readable product comprising:

a computer readable medium having software stored therein that when executed by a processor performs operations including receiving top chip level timing constraints for a top chip level circuit design;

partitioning the top chip level circuit design into at least a first lower-level circuit design and a second lower-level circuit design;

determining a logical timing constraint point for a port of the first lower-level circuit design in response to the top chip level timing constraints of the top chip level circuit design, wherein the logical timing constraint point includes a clock source parameter specifying a clock source governing data propagation over a data path through the port and a delay parameter specifying a data propagation delay over a portion of the data path; and after determining the logical timing constraint point, optimizing the first lower-level circuit design to implement the first lower-level circuit design and performing a lower level timing analysis on the implementation of the first lower-level circuit design using the logical timing constraint point to determine if the implementation of the first lower-level circuit design meets the data propagation delay specified by the delay parameter of the logical timing constraint point.

23. The computer readable product of claim 22, wherein the logical timing constraint point further includes a timing exception parameter related to one or more of the following: a multicycle path, a false path, a maximum delay, and a minimum delay associated with the data path passing through the port of the first lower-level circuit design.

24. The computer readable product of claim 22, wherein if the lower-level timing analysis determines that the lower-level timing of the first lower-level circuit design is not met, the computer readable medium has further software stored therein that when executed by the processor performs operations including modifying the first lower-level circuit design to generate a modified lower-level circuit design to meet the lower-level timing.

25. The computer readable product of claim 24, wherein a plurality of lower-level circuit designs are modified to generate a plurality of modified lower-level circuit designs; and the computer readable medium has further software stored therein that when executed by the processor performs operations including assembling the plurality of modified lower-level circuit designs to form a modified top chip level circuit design; and verifying functional requirements of the modified top chip level circuit design.

* * * * *